United States Patent [19]
Kock

[11] Patent Number: 5,897,203
[45] Date of Patent: Apr. 27, 1999

[54] DOUGH PORTIONING AND KNEADING MACHINE

[75] Inventor: Gerd Kock, Dinkelsbühl, Germany

[73] Assignee: Werner & Pfleiderer Lebensmitteltechnik GmbH, Germany

[21] Appl. No.: 08/585,896

[22] Filed: Jan. 12, 1996

[30] Foreign Application Priority Data

Jan. 13, 1995 [DE] Germany .................. 195 00 851

[51] Int. Cl.⁶ ............................................. A21C 7/06
[52] U.S. Cl. ................................... 366/76.1; 366/76.7
[58] Field of Search ....................... 366/69, 71–75, 366/76.1, 76.5, 76.6, 76.7, 76.8; 426/231, 496, 503; 425/135, 168, 238

[56] References Cited

U.S. PATENT DOCUMENTS 3,125,039  3/1964  Haug .
3,785,623  1/1974  Konig ........................ 366/76.8
5,217,739  6/1993  Stein ........................... 426/496
5,242,698  9/1993  Knost ........................... 426/496

*Primary Examiner*—Robert W. Jenkins
*Attorney, Agent, or Firm*—Laff, Whitesel, Conte & Saret, Ltd.

[57] ABSTRACT

A dough portioning and kneading machine comprises two dough hoppers separated from each other, a conveying chamber, in which a conveying piston is displaceably arranged, being disposed downstream of each dough hopper. At least one metering chamber is disposed downstream of each conveying chamber and is movable between a first position open towards the conveying chamber and a second position free from the conveying chamber. A metering piston is displaceably disposed in each metering chamber and partially releases the metering chamber in the latter's first position and empties the metering chamber in the latter's second position.

4 Claims, 4 Drawing Sheets

DOUGH PORTIONING AND KNEADING MACHINE

BACKGROUND OF THE INVENTION

1. Field of the Invention

The invention relates to a dough portioning and kneading machine.

2. Background Art

Dough portioning and kneading machines as known for instance from U.S. Pat. No. 5,242,698 comprise a dough hopper and a conveying chamber, which is disposed downstream of the latter and has a conveying piston driven to reciprocate and serving to fill a number of metering chambers disposed in a rotary slide valve. Each metering chamber is provided with a metering piston which is displaced with the filling stroke and which, upon the return stroke of the conveying piston, ejects one dough piece at a time from the respective metering chamber, the rotary slide valve being simultaneously rotated. The dough pieces drop into kneading chambers of a kneading device. After the kneading, the kneaded dough pieces are discharged by way of a conveying device and supplied for instance to a fermenter.

In practice, there is the problem that pieces from doughs of different recipes must be metered at the same time, which must then be treated in common, i.e. they must leave the oven in common and at the same time for being packed in a common packet. Very often, these pieces of doughs of varying recipes must even have a different weight.

SUMMARY OF THE INVENTION

It is the object of the invention to embody a dough portioning and kneading machine such that dough pieces of varying recipes can be produced simultaneously side by side.

According to the invention, this object is attained by at least two dough hoppers separated from each other, by a conveying chamber disposed downstream of each dough hopper, by a conveying piston disposed displaceably in each conveying chamber, by at least one metering chamber which is disposed downstream of each conveying chamber and which is movable between a first position open towards the conveying chamber and a second position free from the conveying chamber, by a metering piston which is disposed for displacement in each metering chamber and which partially releases the metering chamber in the latter's first position and which empties the metering chamber in the latter's second position. The measures according to the invention ensure that doughs of varying recipes do not contact, but that different dough pieces from the varying doughs can be produced side by side at the same time. In particular it is ensured that the dough pieces of varying recipes can have a different weight.

Numerous further features, advantages and details of the invention will become apparent from the ensuing description of an exemplary embodiment, taken in conjunction with the drawing.

DESCRIPTION OF THE PREFERRED EMBODIMENT

Figure 1:
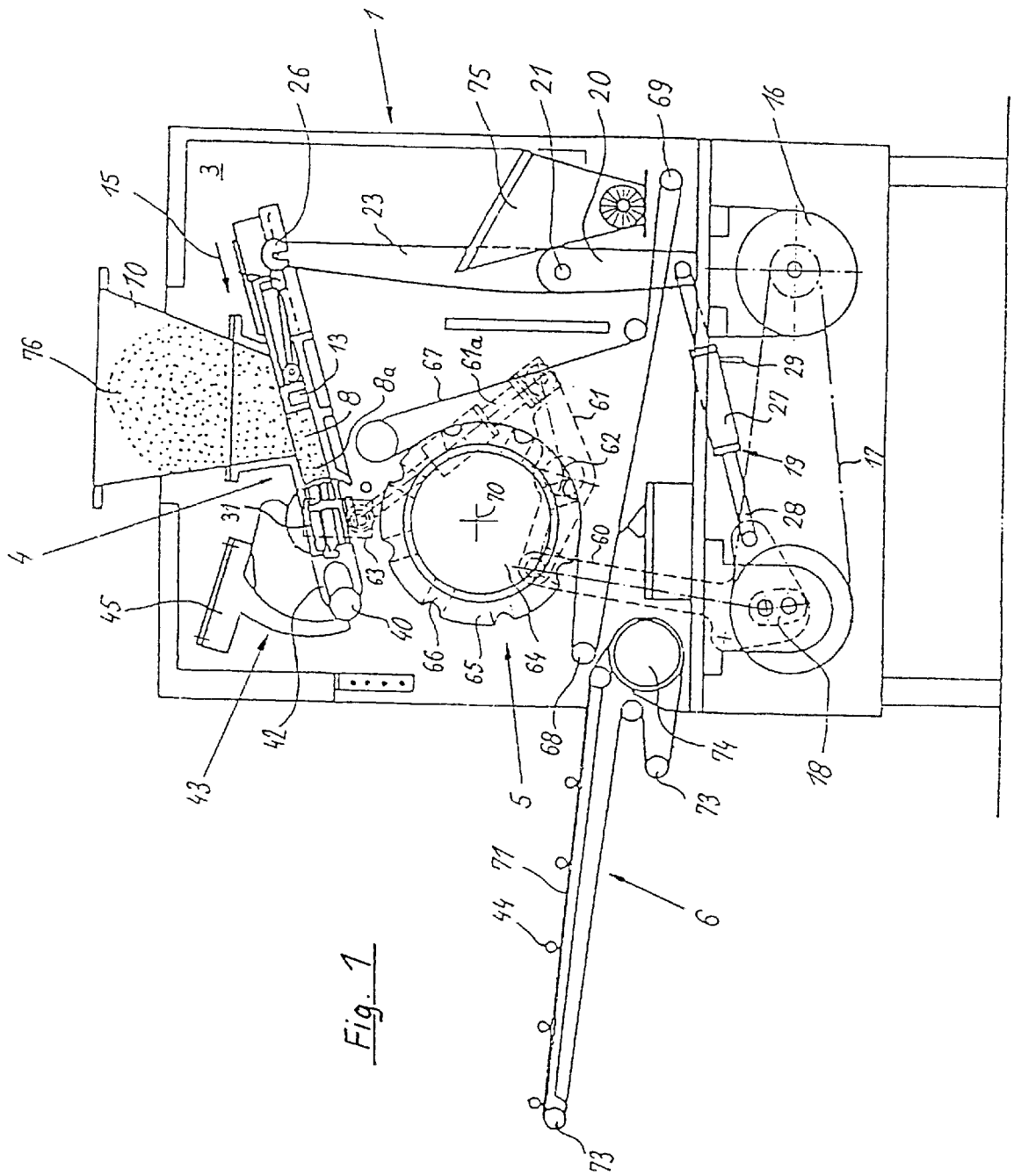
FIG. 1 is a diagrammatic vertical illustration, broken open, of a dough portioning and kneading machine.

The dough portioning and kneading machine seen in the drawing comprises a cuboidal frame 1 with side walls 2, 3. A dough portioning device 4, a kneading device 5 and a conveying device 6 are disposed within the frame 1.

The dough portioning device 4 has two conveying chambers 8, 9, which are separated by a dividing wall 7 and on each of which a dough hopper 10 and 11 is disposed; the hoppers 10, 11, too, may form a unit only separated by a parting wall 12. In each conveying chamber 8 and 9, a conveying piston 13 and 14 is disposed for displacement in the conveying direction 15 and counter to the conveying direction.

The drive of the conveying pistons 13, 14 is effected by a driving motor 16 for instance in the form of a geared motor disposed in the lower portion of the frame 1. A crank drive 18 is driven by the driving motor via a chain transmission 17. The drank drive 18 drives a connecting rod 19 to reciprocate, the connecting rod 19 being in turn articulated to a pivoted lever 20, which is tightly joined to a rock shaft 21 rotatingly run in bearings 22, which are arranged in the side walls 2, 3 of the frame 1. Two rocking levers 23, 24 are fixed to the rock shaft 21 by a releasable clamping device 25 so that the position relative to each other of the rocking levers 23, 24 can be set. The free ends, turned away from the rock shaft 21, of the rocking levers 23, 24 are each connected to a conveying piston 13 and 14 by means of a pivoted connection 26. Upon a rotation of the crank drive 18, the conveying pistons 13, 14 do a full stroke in the conveying direction 15 and a corresponding return stroke counter to the conveying direction 15.

The connecting rod 19 is a hydraulically actuated piston-cylinder drive, the cylinder 27 of which is for instance articulated to the rock shaft 21, while the piston rod 28 is articulated to the crank drive 18. By way of a pressure pipe 29, the cylinder 27 is connected to an adjustable pressure control valve 30. If the counterforce acting on the conveying pistons 13, 14 in the conveying direction 15 during a conveying stroke becomes so high that the hydraulic pressure in the cylinder 27 exceeds a given value set at the pressure control valve, then this pressure control valve 30 opens and the conveying strok of the conveying pistons 13, 14 is interrupted, i.e. the conveying pistons remain in their position and are driven only upon the return stroke counter to the conveying direction 15 during the further rotation of the crank drive 18. Since this is accompanied with a relief from pressure of the cylinder 27, the pressure control valve 30 is correspondigly closed, and for the next stroke of the conveying pistons 13, 14 in the conveying direction 15, the connecting rod 19 has again its original position.

A rotary slide valve 31 to be pivoted for rotation about an axis 32 is situated downstream of the conveying chambers 8, 9 seen in the conveying direction 15. In the rotary slide valve 31, provision is made for a metering unit 33, in which several metering chambers 34 of identical diameter are formed. The metering unit 33 is joined to the rotary slide valve 31 by means of screws 35 for it to be easily replaced by another metering unit 33 having metering chambers 34 of smaller or greater diameter. Metering pistons 36 are disposed displaceably in the cylindrical metering chambers 34 open at both ends, and have a piston area 37, the curvature of which corresponds to the curvature of the rotry slide valve 31. The metering pistons 36 have a slide 38, which projects over the rotary slide valve 31, a pressure pad 39 on the end, opposite to the piston area 37, of the slide 38 bearing against a drum controller 40 and 41, a drum controller 40 being allocated to the metering pistons 36 that are associated with the conveying chamber 8, while another drum controller 41 is allocated to the metering pistons 36 associated with the conveying chamber 9.

The drum controllers 40, 41 each lodge in a pair of forks 42 disposed on the rotary slide valve 31. They are displaceable in these forks 41 radially to the axis 32 of the rotary slide valve 31. The length of the stroke of the metering piston 36 is given by a weight setting device 43, by means of which the weight of a dough piece 44 portioned in a metering chamber 34 is determined.

On a base body 45, this weight setting device 43 comprises pairs of curved segments 46 and 47, the drum controller 40 resting on one pair of curved segments 46 and the drum controller 41 resting on the other pair of curved segments 47. When the rotary slide valve 31 is rotated about its axis 32, then the respective drum controller 40 and 41 is guided along the curved segments 46 and 47, whereby the metering pistons 36 may do a stroke, which still remains to be specified below. The base body 45 lodges in the frame 1 in a manner displaceable by means of a guide 45a. It is joined to two connecting rods 48, which run parallel in the vicinity of the side walls 2, 3, and to the end, turned away from the base body 45, of which a double-armed lever 49 is articulated, which is supported on the side wall 2 and the side wall 3 for pivoting by means of a pivot hinge 50. A setting shaft 51, to be rotated by a hand-wheel 52, is rotatably supported on the side walls 2, 3 of the frame 1. Two cam disks 53 are mounted on the setting shaft 51 and rest on adjusting pins 54 that are applied by the levers 49. The setting shaft 51 with the cam disks 53 being pivoted, this will displace the base body 45 together with the curved segments 46 and 47 so that the position of the curved segments 46 and 46 relative to the rotary slide valve 31 is modified. This displacement of the base body 45 with the curved segments 46 and 47 takes place such that in the case of a position of the rotary slide valve 31 with the metering chambers 34 open towards the conveying chambers 8, 9, the piston areas 47 of the metering pistons 36 are always in alignment with the cylindrical face 31a of the rotary slide valve 31. The displacement of the base body 45 takes place against the force of a biased tension spring 47a acting on at least one connecting rod 48 on the one hand and on the frame 1 on the other, so that the adjusting pins 54 permanently bear against the respective cam disk 53.

The curved segments 47, against which the drum controller 41 bears, are mounted on a slide block 55, which is supported on the base body 45 in a manner displaceable in the direction of the connecting rods 48. Adjustment takes place by means of a spindle 57, which is actuated by way of a handwheel 56 and can be arrested by nuts 58 or the like in its position set. The setting shaft 51 and the levers 49 and the connecting rods 48, respectively, are arrested by a clamping device 59 in their position set.

The rotary slide valve 31 is likewise driven by the driving motor 16 by way of the crank drive 18. To this end, a connecting rod 60 is articulated to the crank drive 18, a bent double-armed lever 61 which lodges off-center in the frame 1 being articulated to the other end of the connecting rod 60. A connecting rod 61a is articulated to the end of the lever 61 that is turned away from the connecting rod 60, the connecting rod 61a being again articulated to a pivoted lever 63 which is tightly joined to the rotary slide valve 31. During a revolution of the crank drive 18, the connecting rod 60 moves up and down once, and the bent lever 61 pivots once up and once down. As a result, the pivoted lever 63 is pivoted to and fro once, driving the rotary slide valve 31 lodged rotatably in the frame 1. In this case the rotary slide valve 31 moves into a position in which the metering chambers 34 are open towards the conveying chambers 8 and 9. On the other hand, it moves into a position shown in FIG. 3, in which the metering chambers 34 are open towards the kneading device 5 disposed below them.

Conventionally, the kneading device 5 comprises a kneading drum 64 which is enclosed concentrically by a chamber drum 65. In the chamber drum 65, kneading chambers 66 are formed, which are open outwards and in a direction towards the kneading drum 64 and into which to place the dough pieces 44. Over part of its circumference, the chamber drum 65 is encircled by a kneading belt 67 which forces the dough pieces 44 against the kneading drum 64 and prevents them from dropping out of the kneading chambers 66. The continuous kneading belt 67 is guided via various deflection pulleys 68 and a tightening pulley 69 and is driven free from slippage by the chamber drum 65 which can be driven to rotate. The kneading drum 64 is movable in the direction of the axis 70 common to the kneading drum 64 and the chamber drum 65 and in the tangential direction, i.e. in the circumferential direction relative to the chamber drum 65, and is thus oscillatingly movable for the round kneading of the dough pieces 44 that are located in the kneading chambers 66 and bear against the kneading drum 64 on the one hand and against the kneading belt 67 on the other. The design and functioning of kneading devices of this type are known generally for instance from U.S. Pat. No. 3,152,039, to which reference is made. In the direction of the axis 70 of the chamber drum 65, provision is made for as many kneading chambers 66 disposed therein one after the other as there are metering chambers 34 in the rotary slide valve 31.

The conveying device 6 comprises continuous conveyor belts 71 and 72 which are spread apart and guided via deflection pulleys 73 and a driving pulley 74. The number of conveyor belts 71 corresponds to the number of the metering chambers 34 allocated to the conveying chamber 8; the number of conveyor belts 72 corresponds to the number of the metering chambers 34 allocated to the conveying chamber 9. The conveying device 6 leads for instance to a fermenter disposed downstream. A flour pourer 75 is allocated to the kneading belt 67.

Figure 2:
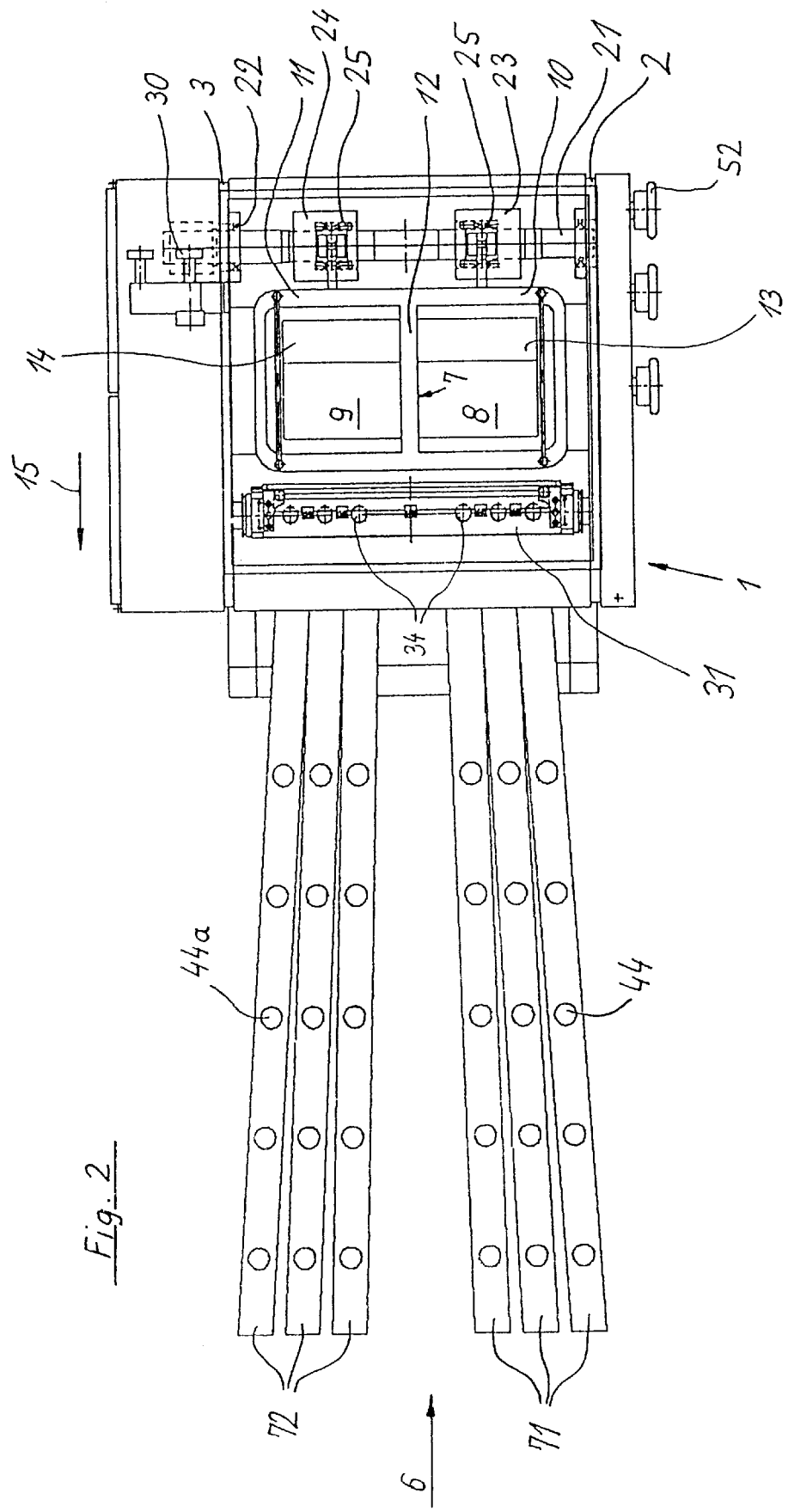
FIG. 2 is a plan view of the dough portioning and kneading machine.

The machine illustrated and specified works as follows:

One sort of dough 76 is in the dough hopper 10, another sort of dough, not shown in the drawing, is in the other hopper 11. Upon the return stroke of the conveying pistons 13, 14 counter to the conveying direction 15 and into the position seen in FIGS. 1 and 2, the dough 76 located in the respective hopper 10 and 11 is sucked into the conveying chambers 8 and 9, filling them as seen in FIG. 1. With a conveying stroke of the conveying pistons 13, 14 in the opposite direction, namely in the conveying direction 15, the conveying pistons 13, 14 are displaced in the direction towards the rotary slide valve 31. When reaching the closed sections 8a and 9a, no longer open twords the respective dough hopper 10 and 11, of the conveying chambers 8, 9, the conveying pistons 13, 14 close the conveying chambers 8, 9. The rotary slide valve 31 is in a position seen in FIG. 1, in which the metering chambers 34 are open towards the respective conveying chamber 8 and 9. As a result of the conveying stroke of the conveying pistons 13 and 14, the metering chambers 34 are filled with dough 76, the metering pistons 36 being displaced such that the drum controller 40 or 41 allocated to them rests on the curved segments 46 or 47. In this way the stroke of the metering pistons 36 is defined, determining the volume and thus the weight of the dough pieces 44 and 44*a*. If, during this filling or conveying stroke, the pressure becomes to high in the closed sections 8*a* and 9*a* of the conveying chambers 8 and 9, then the pressure control valve 30 allocated to the connecting rod 19 opens as specified above.

Figure 3:
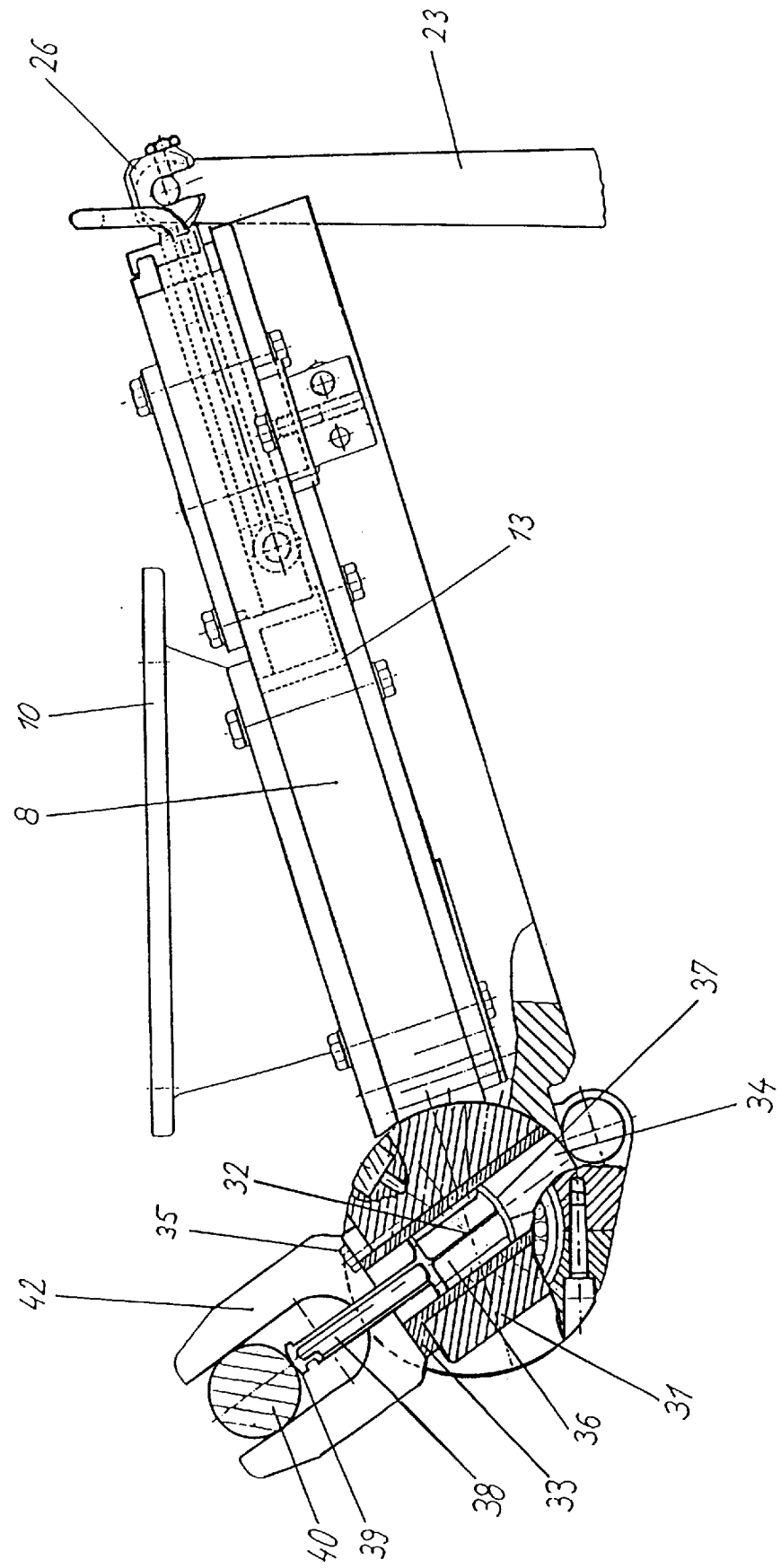
FIG. 3 is an illustration of the dough portioning device on an enlarged scale as compared to FIG. 1.
Figure 4:
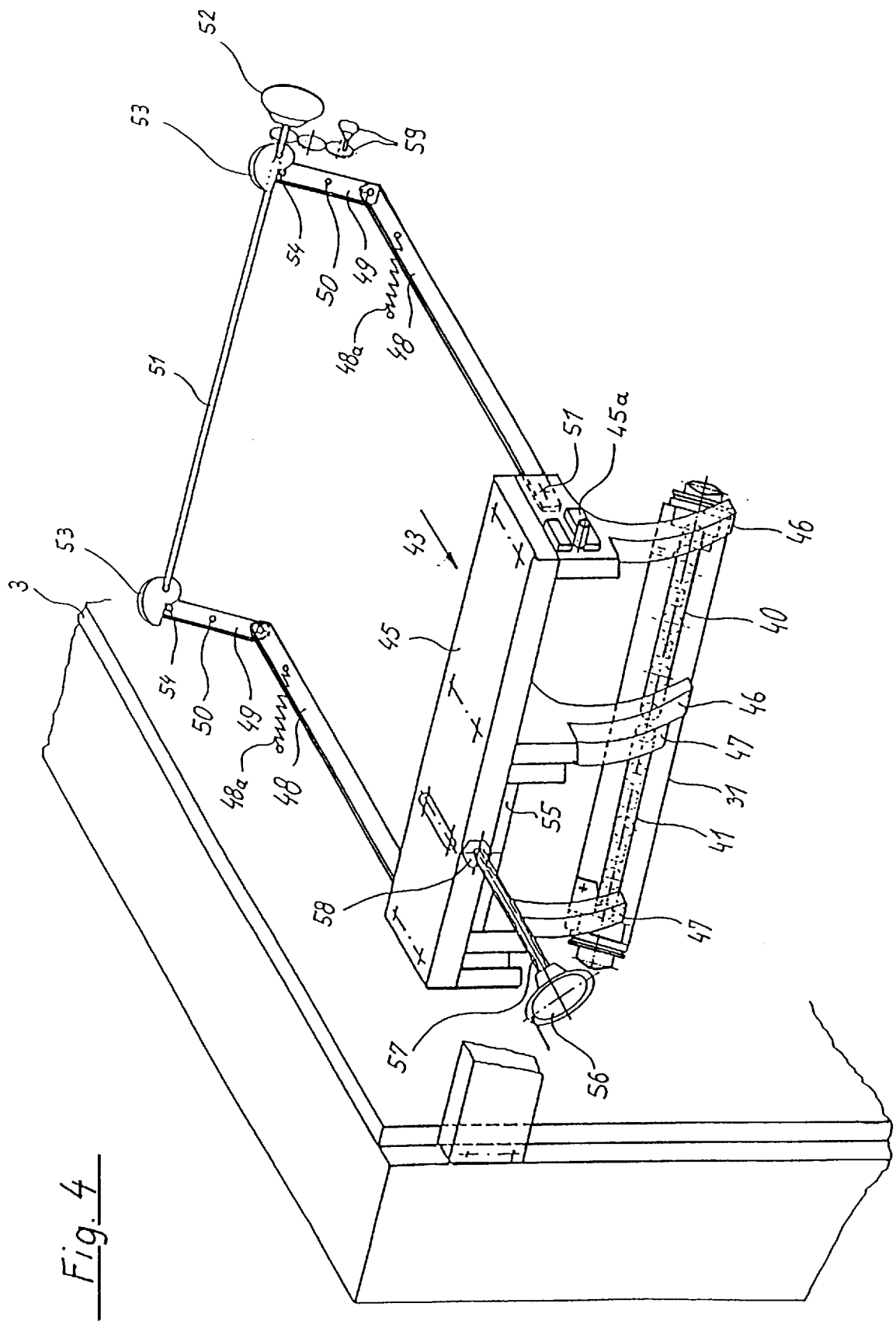
FIG. 4 is a perspective view of a weight setting device.

During the ensuing return stroke of the conveying pistons 13, 14, the rotary slide valve 31 is pivoted—clockwise in FIGS. 1 and 3—as a result of which the drum controllers 40 and 41 roll along the curved segments 46 and 47 of the weight setting device 43, displacing the metering pistons 36 in the metering chambers 34 such that the dough pieces 44, 44*a* located in the metering chambers 34 are discharged downwards by the piston areas 37 and drop into the kneading chambers 66 of the kneading device 5.

Each of the two dough hoppers 10, 11 may contain a dough 76 of a different recipe. The portioned dough pieces 44 and 44*a* of different doughs from the conveying chamber 8 on the one hand and from the conveying chamber 9 on the other can differ in weight, because the weight setting can vary. The different dough pieces 44, 44*a* can be discharged separately after the kneading.

Offset from each other by a small angle, the clamping devices 25 can be fixed on the rock shaft 21 so that a conveying piston 13 or 14 will lead, referred to the other conveying piston 14 or 13, in the conveying direction 15 during the conveying stroke. This ensures that the filling pressure set for the conveying chamber 8 or 9, which is associated with the leading conveying piston 13 or 14, is reached sooner than it is in the conveying chamber 9 or 8 associated with the lagging conveying piston 14 or 13. As a result, the pressure control valve 30 already opens when the filling pressure previously set is reached in the conveying chamber 8 or 9 associated with the leading conveying piston 13 or 14. Consequently, a lower filling pressure is reached in the conveying chamber 9 or 8 associated with the lagging conveying piston 14 or 13. Since dough is a compressible substance, this possibility can be used where two different sorts of dough of strongly deviating consistence and strongly deviating compressibility are employed.

Instead of the design specified above, two metering units 33 can be provided in the rotary slide valve 31, one of which being allocated to each conveying chamber 8 or 9. These metering units can have metering chambers 34 of varying diameter.

What is claimed is:

1. A dough portioning and kneading machine comprising:

at least two dough hoppers (10, 11) separated from each other;

a conveying chamber (8, 9) disposed downstream of each dough hopper (10, 11), each conveying chamber (8, 9) having a filling opening to a dough hopper (10, 11) and an extracting opening;

a conveying piston (13, 14) disposed in each conveying chamber (8, 9);

drive means for displacing said conveying piston (13, 14) in each conveying chamber (8, 9) by a stroke from a first position in the vicinity of said filling opening in a conveying direction (15) to a second position in the vicinity of said extracting opening and counter to the conveying direction (15) to said first position;

at least one metering chamber (34) which is disposed downstream of each conveying chamber (8, 9) and which has one extracting opening;

drive means for moving said at least one metering chamber (34) between a first position, in which said extracting opening of said metering chamber (34) is connected to said extracting opening of said conveying chamber (8, 9), and a second position, in which said extracting opening of said metering chamber (34) is disconnected from said extracting opening of said conveying chamber (8, 9) and open to a kneading device (5);

a metering piston (36) which is disposed in each metering chamber (34); and drive means for displacing said metering piston (36) by a stroke from a first position retracted from said extracting opening of said metering chamber (34), when said extracting opening of said metering chamber (34) is connected with said extracting opening of said conveying chamber (8, 9), to a second position in the vicinity of said extracting opening of said metering chamber (34), when said extracting opening of said metering chamber (34) is disconnected from said extracting opening of said conveying chamber (8, 9).

2. A dough portioning and kneading machine according to claim 1, wherein said drive means for displacing said metering piston (36) include adjusting means for variably adjusting said stroke of said metering piston (36).

3. A dough portioning and kneading machine according to claim 1, wherein said drive means for displacing said metering piston (36) include a drum controller (40, 41), against which bears the at least one metering piston (36), and which is allocated to each conveying chamber (8, 9), the drum controllers (40, 41) bearing against curved segments (46, 47) and displacing the metering pistons (36) in the metering chambers (34) when the metering chambers (34) move from said first into said second position, and wherein adjusting means are provided to displace the curved segments (46) allocated to a drum controller (40) in relation to the curved segments allocated to another drum controller (41).

4. A dough portioning and kneading machine according to claim 1, wherein the stroke of the conveying pistons (13, 14) is adjustable.

\* \* \* \* \*